Nov. 2, 1971  C. M. HARDEN  3,616,690
WEIGHT MEASURING APPARATUS
Filed June 25, 1970  3 Sheets-Sheet 1

INVENTOR
CHARLES M. HARDEN
BY
ATTORNEYS

United States Patent Office 3,616,690
Patented Nov. 2, 1971

3,616,690
WEIGHT MEASURING APPARATUS
Charles M. Harden, Natick, Mass., assignor to Searle
Medidata, Inc., Waltham, Mass.
Filed June 25, 1970, Ser. No. 49,616
Int. Cl. G01g 3/14, 9/00; G01m 19/00
U.S. Cl. 73—172
8 Claims

ABSTRACT OF THE DISCLOSURE

Apparatus especially useful in medical screening for determining gross weight and relative weight distribution between the left and right foot of an individual and between the ball and heel of each foot. A platform is provided to support an individual and is in turn supported on three springs each of which has affixed thereto a plurality of strain gauges. The strain gauges are selectively coupled to associated signal processing circuitry operative to provide electrical output signals representative of the total weight and relative weight distributions of the individual standing upon the platform.

FIELD OF THE INVENTION

This invention relates to electro-mechanical weighing apparatus and more particularly to apparatus for determining the gross weight and relative weight distribution of an individual.

BACKGROUND OF THE INVENTION

In the medical examination of a patient useful data concerning the neuro-muscular condition of a patient can be derived from measurements concerning the relative weight distribution between the left and right feet and between the ball and heel of each foot. Apparatus to provide such measurements have heretofore been rather cumberson laboratory arrangements for experimental use and were not of a form or construction to permit practical, efficient and reliable operation in a clinical environment such as would be useful for the screening of patients.

SUMMARY OF THE INVENTION

In accordance with the present invention, apparatus is provided for determining the gross weight and relative weight distribution of an individual in a relatively simple and yet accurate and reliable manner. The invention is embodied in a housing much like a well-known clinical platform scale which may also include a height measuring column. Electrical output signals are provided which are representative of the relative and gross weights and these output signals can be applied to suitable indicators for display of the weight measurements or can be directed to a computer for processing along with other data concerning the physical condition of an individual.

In brief, the invention comprises a platform adapted to support an individual standing thereupon and having a plurality of springs maintaining the platform in spaced relation to a mounting base. Each leaf spring has affixed thereto in intimate relationship a plurality of strain gauges wired in a bridge configuration, the electrical outputs of which are applied to signal processing circuitry for providing output signals representative of the gross weight and relative weight distributions of the individual standing upon the platform.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
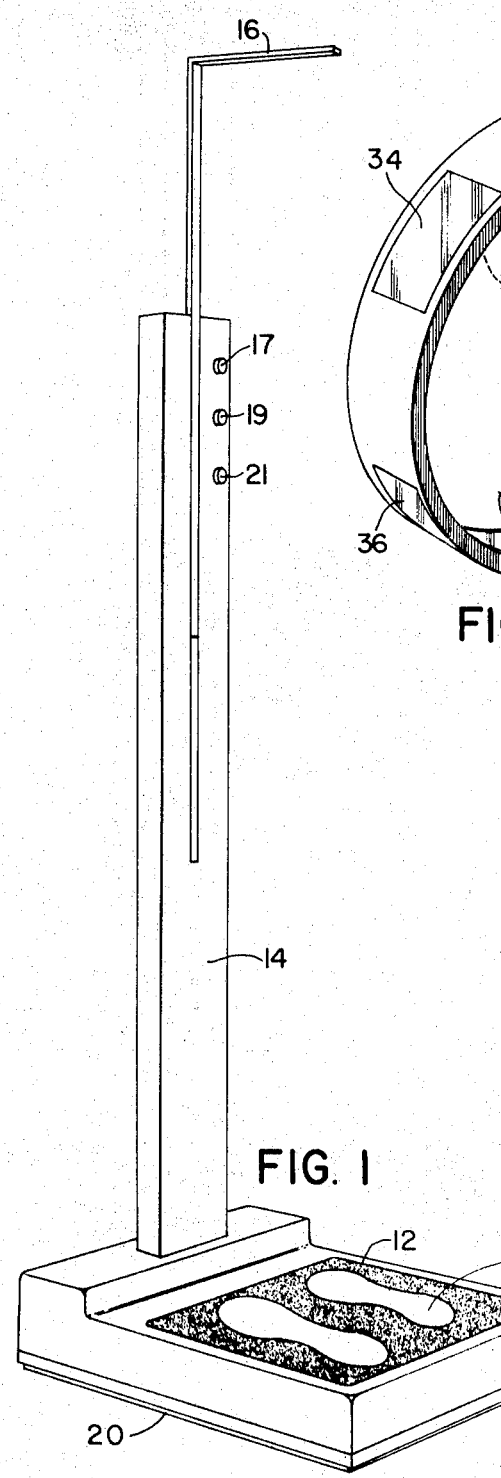
FIG. 1 is a pictorial view of weight measuring apparatus embodying the invention.

Apparatus according to the invention for determining the relative weight distribution and gross weight of an individual is illustrated in its external configuration in FIG. 1. Referring to FIG. 1 there is shown a generally rectangular platform 10 having an upper surface on which an individual can stand. This upper surface may include a pebbled surface 12 which may be, for example, a rubber mat to provide a non-slip surface on which to stand. A foot print pattern 13 is provided on surface 12 to denote the location at which a patient is to stand for proper relative weight determination. An upstanding column 14 is provided on the rear portion of housing 10 and contains a height measuring rod 16 which is vertically movable within a slot 18 provided on column 14. Control buttons 17, 19, and 21 are provided on column 14. Controls 17 and 19 are for actuating a weight measurement and height measurement, respectively, while control 21 is an enter button for causing entry of data to signal processing circuitry. It is evident that the invention appears substantially similar to a well-known clinical scale.

Figure 2:
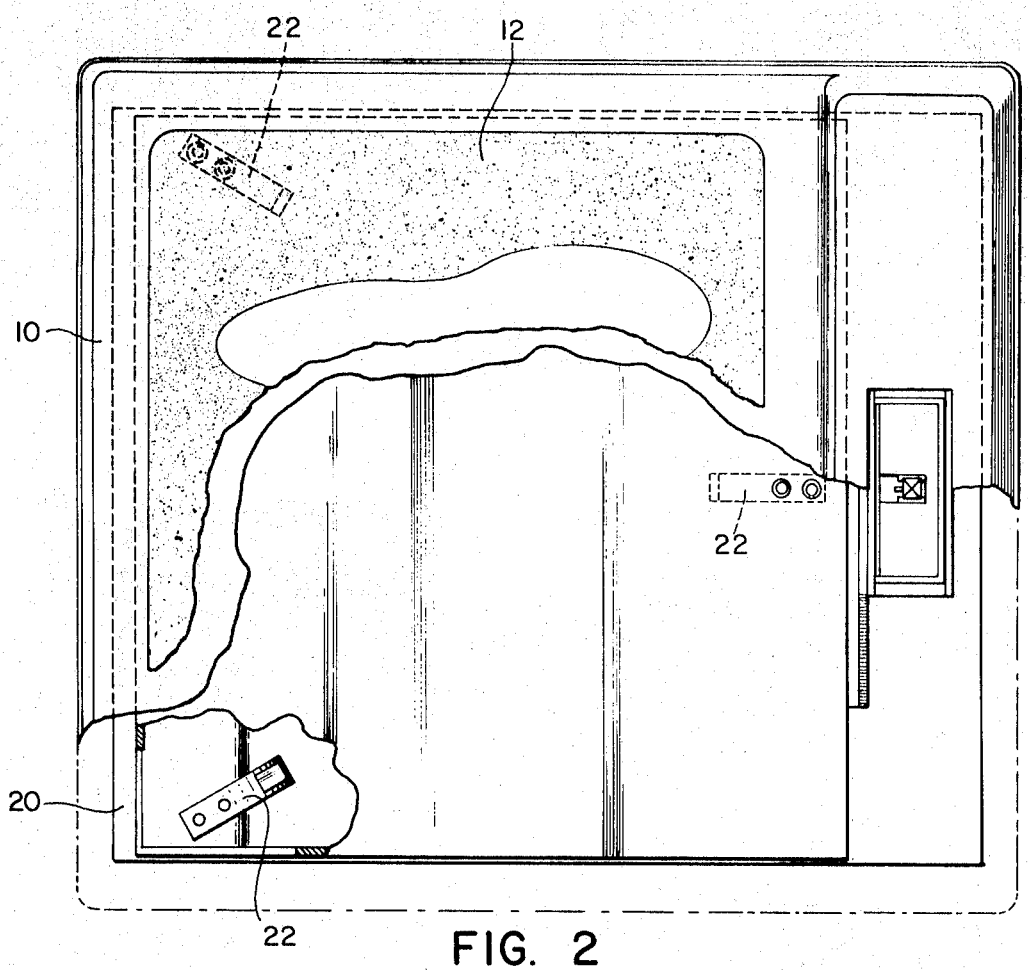
FIG. 2 is a cut-away plan view of apparatus embodying the invention.
Figure 3:
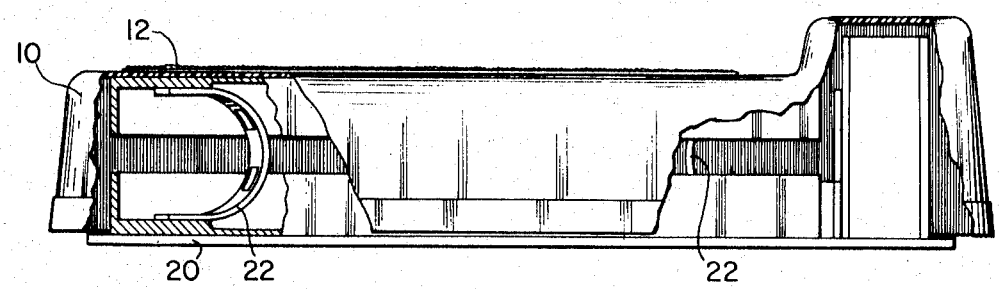
FIG. 3 is a cut-away elevation view of apparatus embodying the invention.

The construction of the novel apparatus is more particularly shown in FIGS. 2 and 3. The platform 10 is supported in spaced relation to a base member 20 by three U-shaped leaf spring members 22 each of which has one end affixed to base member 20 and the other end affixed to the under surface of platform 10. As seen most clearly in FIG. 2, one spring member is disposed at a position at the center of one side of platform 10 adjacent column 14, while the other two spring members are disposed near respective corners of platform 10 on a side opposite to the center spring member, with the latter two spring members being angularly disposed toward the central portion of platform 10.

Figure 4:
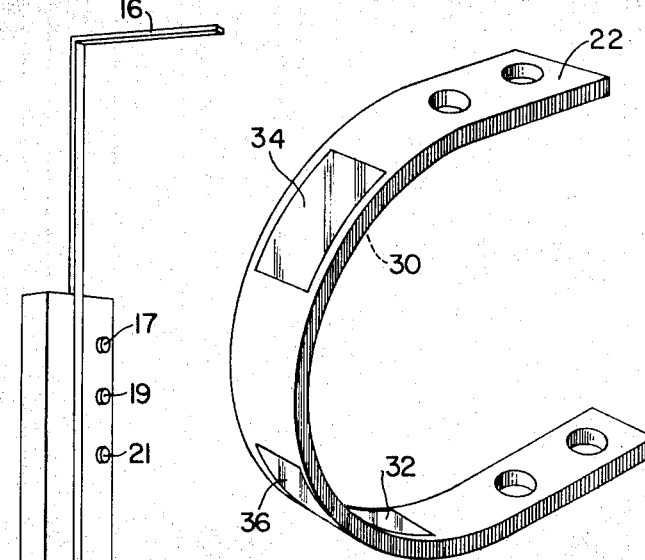
FIG. 4 is a pictorial view of a leaf spring assembly employed in the invention.

A spring member 22 is illustrated in greater detail in FIG. 4 and is typically formed of spring steel. A pair of strain gauges 30 and 32 are intimately attached to the inner concave surface of spring 22, while a second pair of strain gauges 34 and 36 are similarly attached to the outer convex surface thereof. The four strain gauges of each spring member 22 are wired in a standard bridge configuration such that a differential voltage is provided proportional to the strain experienced by the associated spring.

Figure 5:
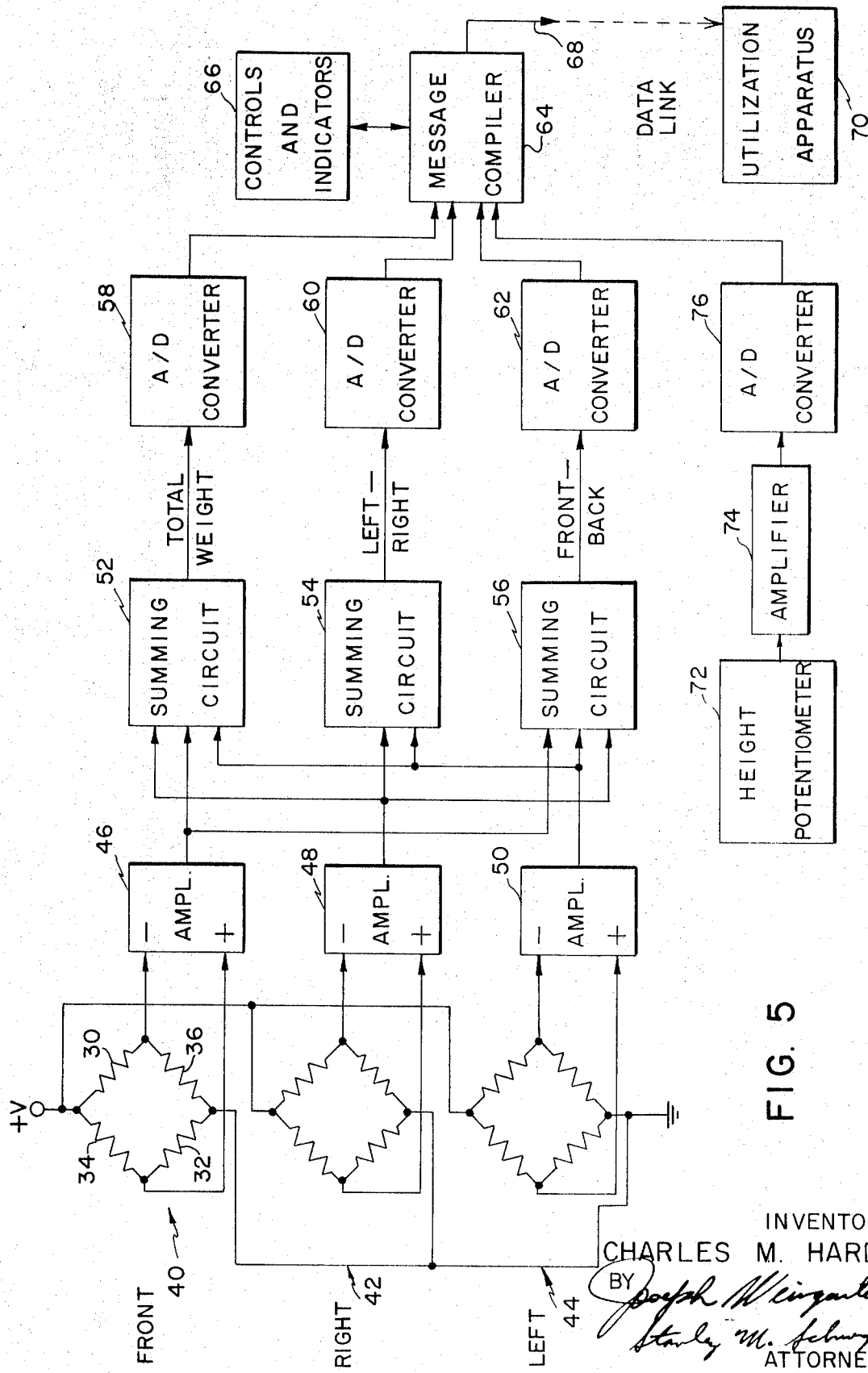
FIG. 5 is a block diagram of signal processing circuitry employed in the invention.

The circuitry for processing the voltages provided by the transducers is illustrated in FIG. 5. Three strain gauge bridges 40, 42, and 44, each associated with a respective spring member 22, are energized from a source of suitable reference potential +V. Bridge 40 is associated with front spring 22, while bridges 42 and 44 are associated with the right and left springs 22, respectively. The output signals of each bridge are coupled to respective amplifiers 46, 48, and 50, each of which generates a voltage proportional to the strain sensed by the associated bridge.

The output voltages from bridge amplifiers 46, 48, and 50 are combined in a summing circuit 52 which provides an output signal representative of the total weight of a person standing on platform 10. The output signals from bridge amplifiers 48 and 50 are also applied to a summing circuit 54 which provides an output signal which is the difference between the signals from bridges 42 and 44 and which is representative of the left-right weight distribution of a person standing on platform 10. The output signals from amplifiers 46, 48, and 50 are also applied to a third summing circuit 56, which provides an output signal representative of the front-back weight distribution of each foot. The total weight signal from summing circuit 52 is applied to an analog to digital converter 58, while the output signals from summing circuits 54 and 56 are applied to respective analog to digital converters 60 and 62. The output signals of converters 58, 60, and 62 are applied to a message compiler 64, which includes suitable controls and indicators 66, operative to assemble the total weight and weight distribution measurements into a data message for transmission, for example over a data link 68, to suitable utilization apparatus 70 which may be an indicator for visually denoting the weight measurements, or which can also be a computer for storage of the digital versions of the weight measurements for subsequent processing and display.

In operation, the weight measurements can be taken by depressing control 17 located on column 14 which enables the message compiler 64 to assemble digital information representing the gross weight and relative weight distributions of the patient standing upon platform 10. These digital weight representations can be stored, for example, in shift registers provided as part of compiler 64. Upon activation of enter button 21, this digital information is conveyed via data link 68 to the computer or other utilization apparatus 70 for subsequent processing and/or display.

The particular relative weight distributions required can be selected in accordance with individual requirements. For example, the left-right or right-left weight distributions can be provided as required simply by utilizing a summing circuit 54 operative to provide an output signal representing the difference between the corresponding strain gauge bridges 42 and 44. Similarly, the summing circuit 56 can be operative to provide output signals representative of the front-back weight distribution of both feet of a person standing upon platform 10 or of each individual foot. The implementation of the particular circuitry for producing digital signals representing the weight measurements is well known to those versed in the electronics art and need not be described in detail herein. The system can be initially calibrated by utilizing a standard weight such that weight measurements are provided with respect to the reference measurement.

As seen in FIG. 1, the invention can also include a height measuring column 14 which in appearance is much like a column for visually determining a patient's height. According to the present invention however, the height measuring process is automated to provide a digital representation of this measurement which may be suitably displayed or conveyed to a computer for use in subsequent processing of a patient's medical record. Referring again to FIG. 5, there is shown a height potentiometer 72 which is coupled to a measuring rod 16 (FIG. 6) and which provides an output voltage directly related to the vertical position of rod 16. Potentiometer 72 is coupled to an amplifier 74 which, in turn, is coupled to an analog to digital converter 76. The output of converter 76 is coupled to message compiler 64. The analog signal produced by amplifier 74 and which is representative of a patient's height as determined by potentiometer 72, is transformed by converter 76 to a digital representation of height which is assembled in message compiler 64 into a data word for transmission to suitable utilization apparatus 70, such as a digital computer.

Figure 6:
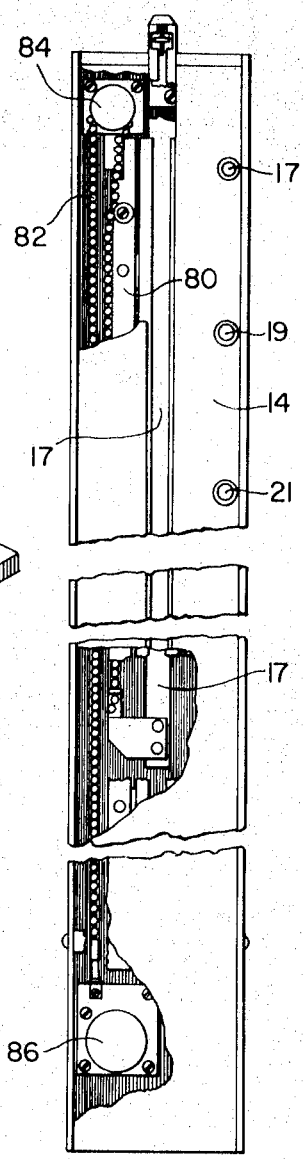
FIG. 6 is a cut-away elevation view of a height measuring column which can be employed with the invention.

The height measuring apparatus is illustrated in its mechanical configuration in FIG. 6. A vertically slidable rod 17 is disposed within a channel provided in column 14 and includes on the upper end thereof a horizontally disposed rod 16 for contacting a patient's head. The lower end of rod 17 is coupled by an arm 80 to one end of a beaded chain 82 or other linkage which passes around a cooperative pulley associated with potentiometer 84 and which terminates at its opposite end in a spring loaded takeup spool 86. In operation, vertical adjustment of rod 17 within housing 14 causes corresponding movement of chain 82 which causes rotation of potentiometer 84 to a position providing an output signal of a magnitude representative of the height of a patient as sensed by the position of measuring rod 16. This output signal as described hereinabove, is converted to a digital representation of patient height and transmitted to a digital computer or other utilization apparatus for display or subsequent processing.

The invention is not to be limited by what has been particularly shown and described as alternative implementations will occur to those versed in the art without departing from the spirit and true scope of the invention.

What is claimed is:

1. Apparatus for determining gross weight and relative weight distribution comprising:
   a platform adapted to support a person standing thereon;
   a plurality of spring members each attached to said platform and operative to support said platform in spaced relationship to a stationary base member;
   a plurality of strain gauges intimately attached to each spring member and wired in a bridge configuration; and
   circuitry coupled to said strain gauge bridges and operative to produce signals representative of the total weight of a person standing on said platform, and the relative weight distributions between the left and right feet and between the ball and the heel of the feet of said person.

2. Apparatus in accordance with claim 1 wherein said circuitry includes:
   a plurality of summing circuits each selectively coupled to said strain gauge bridges and operative to respectively provide signals representative of the total weight and the relative weight distributions of a person standing on said platform; and
   means for converting said signals into digital representations of said weight measurements.

3. Apparatus in accordance with claim 2 wherein said circuitry further includes means for assembling said digital representations into messages for transmission to utilization apparatus.

4. Apparatus in accordance with claim 1 wherein said plurality of spirng members includes:
   a first spring disposed at the center of one side of said platform forwardly of a person standing on said platform; and
   second and third springs each disposed at a respective corner of said platform on a side opposite said first spring and each angularly disposed toward the central portion of said platform.

5. Apparatus in accordance with claim 4 wherein said platform includes a non-skid surface on which a person stands and a foot print pattern denoting the position at which a person is to stand.

6. Apparatus in accordance with claim 1 including:
   a height measuring column disposed in association with said platform and including:
      a vertically slidable measuring rod;
      a potentiometer coupled to said measuring rod and operative to provide an output signal representative of the position of said rod; and
      circuitry coupled to said potentiometer and operative to provide a digital representation of a height measurement of a person standing upon said platform as determined by the position of said rod.

7. Apparatus in accordance with claim 6 wherein said measuring rod has one end attached to a flexible linkage which is in coupling engagement with said potentiometer and which has an opposite end connected to a spring loaded takeup spool.

8. Apparatus in accordance with claim 4 wherein each of said springs is a generally U-shaped leaf spring connected between said platform and said base member.

References Cited

UNITED STATES PATENTS

| | | | |
|---|---|---|---|
| 2,653,475 | 9/1953 | Kraus | 73—172 |
| 2,666,262 | 1/1954 | Ruge | 177—211 X |
| 2,930,227 | 3/1960 | Spademan et al. | 177—211 X |
| 3,027,761 | 4/1962 | Lauro | 177—245 X |
| 3,201,983 | 8/1965 | Hebert et al. | 177—211 X |
| 3,439,761 | 4/1969 | Laimins | 177—211 |
| 3,504,540 | 4/1970 | Pradko et al. | 73—172 X |

FOREIGN PATENTS

| | | | |
|---|---|---|---|
| 974,974 | 10/1950 | France | 177—211 |
| 1,413,995 | 9/1965 | France | 73—172 |

ROBERT S. WARD, Jr., Primary Examiner

U.S. Cl. X.R.

177—200, 211, 245